United States Patent [19]

Hammond et al.

[11] Patent Number: 5,089,207
[45] Date of Patent: Feb. 18, 1992

[54] SINGLE PLY REINFORCED THERMOPLASTIC COMPOSITE

[75] Inventors: Melody A. Hammond; Donnie G. Brady, both of Bartlesville, Okla.

[73] Assignee: Phillips Petroleum Company, Bartlesville, Okla.

[21] Appl. No.: 237,708

[22] Filed: Aug. 29, 1988

[51] Int. Cl.$^5$ .............................................. B27N 3/10
[52] U.S. Cl. .................................. 264/257; 428/34.7; 428/273; 428/902
[58] Field of Search ................ 264/257; 428/251, 268, 428/273, 282, 902, 34.7

[56] References Cited

U.S. PATENT DOCUMENTS

| | | | |
|---|---|---|---|
| 3,562,199 | 2/1971 | Hill, Jr. et al. | 260/37 |
| 4,377,546 | 3/1983 | Helminiak et al. | 264/232 |
| 4,386,118 | 5/1983 | Young | 427/178 |
| 4,471,247 | 9/1984 | Cotton | 310/45 |
| 4,814,224 | 3/1989 | Geibel et al. | 428/902 |

Primary Examiner—James J. Bell
Attorney, Agent, or Firm—Laney, Dougherty, Hessin & Beavers

[57] ABSTRACT

A single ply reinforced thermoplastic composite which may be annealed in a predetermined shape. At least one layer of plastic material is impregnated on a layer of reinforcing material to form a single flexible ply. The ply is formed to the predetermined shape, such as a roll, and annealed in that shape such that the ply returns to the shape when released after being extended therefrom. One preferred thermoplastic material is polyphenylene sulfide. The sheet is well adatped for applications such as aircraft window shades. A method of manufacturing such a composite sheet is also disclosed.

17 Claims, 1 Drawing Sheet

SINGLE PLY REINFORCED THERMOPLASTIC COMPOSITE

BACKGROUND OF THE INVENTION

1. Field Of The Invention

This invention relates to reinforced composite materials, and more particularly, to a reinforced thermoplastic composite which may be annealed to impart a "memory" to the material of a predetermined shape for use in applications such as aircraft window shades.

2. Description Of The Prior Art

Multiple ply laminates have been used in the aircraft industry for window shades. The multiple ply laminate forming the shade is wrapped into an elongated roll or coil, and the shade may be drawn over the window, thus unrolling the rolled material. Well known guide means are used to hold the shade in a generally flat position when unrolled.

A problem with multiple ply laminates is that they are relatively more expensive than single ply laminates or composites. However, previous single ply laminates have had a problem in that they are brittle, and thus not well adapted for being rolled as is required in a window shade application.

The present invention provides a single ply thermoplastic composite and method of manufacture thereof which results in a sheet which is flexible and which will automatically return to its rolled state when released from an unrolled state. A single ply composite using a polyphenylene sulfide as the thermoplastic with a flexible reinforcing material does not have the brittleness problems of previous single ply laminates. The sheet may also be formed in different shapes other than rolls.

SUMMARY OF THE INVENTION

The single ply reinforced thermoplastic composite of the present invention may be described as a shaped composite sheet comprising a reinforcing material, and a layer of thermoplastic impregnated on the reinforcing material for forming a single flexible ply, the ply being formed to a predetermined shape and annealed when in this shape such that the ply will return to the predetermined shape when released after being extended from the predetermined shape. One type of reinforcing material that may be used is a woven glass fiber. Preferably, the thermoplastic is a polyarylene sulfide material such as polyphenylene sulfide. The polyphenylene sulfide may be applied as a layer on both sides of the reinforcing material. In one embodiment, titanium oxide is added to the polyphenylene sulfide.

The composite sheet may be formed into any desired predetermined shape, such as a roll which is well adapted for use in aircraft window shades. Such a window shade may be said to comprise a layer of reinforcing material, and a layer of polyphenylene sulfide, or similar material, impregnated thereon resulting in a flexible sheet which is annealed in a rolled form. The sheet is extendable from the rolled form, and the sheet returns to the rolled form when retracted from an extended position. The window shade forms a portion of an aircraft window further comprising means for guiding the sheet toward and away from the extended position and for holding the extended portion of the sheet substantially flat.

The present invention also includes a method of making a shaped composite sheet. The method may be generally described as comprising the steps of providing a roll of composite sheet with the composite sheet comprising fibrous reinforcement in a continuous matrix of thermoplastic resin, annealing the roll at a temperature between a glass transition temperature and a softening temperature of the resin for setting a shape of the sheet to a configuration of a roll, and cooling the roll. In addition to a roll, the composite sheet may be formed into other predetermined shapes. The step of providing the roll of composite sheet comprises applying heat and pressure to the thermoplastic resin for softening and flowing the resin into the fibrous reinforcement. The method may further comprise cooling the composite sheet after applying the heat and pressure prior to forming the sheet into a roll.

In one embodiment, the method comprises the steps of impregnating polyphenylene sulfide or other suitable thermoplastic material on a layer of reinforcing material such that a composite sheet is formed, cooling the composite sheet as necessary, shaping the composite sheet into a desired form, and annealing the sheet while retaining the sheet in the desired form. The step of impregnating may comprise impregnating a layer of polyphenylene sulfide approximately two mils thick on a layer of woven glass fiber. The step of impregnating may also be said to comprise impregnating a layer approximately three mils thick of polyphenylene sulfide with titanium oxide added thereto on a layer of woven glass fiber.

In one embodiment, the step of impregnating comprises applying pressure to the polyphenylene sulfide and reinforcing material at approximately 100 psi.

In one preferred embodiment, the step of shaping comprises rolling the composite sheet into a rolled form and may further comprise positioning retaining means on the sheet for retaining the sheet in the rolled form during the step of annealing.

In one embodiment, the step of annealing comprises heating the sheet at approximately 400° F. for a predetermined time, such as approximately 1.5 hours.

It is an important object of the invention to provide a single ply thermoplastic composite material which will return to a retracted, predetermined shape after being released from an extended position.

It is another object of the invention to provide an annealed composite sheet suitable for applications such as aircraft window shades.

It is a further object of the invention to provide a single ply composite, annealed in roll form, which retains its cell strength and will return to its rolled position after being unrolled.

Still another object of the invention is to provide a method of making a shaped composite sheet in which the sheet is annealed while retained in a predetermined shape.

Additional objects and advantages of the invention will become apparent as the following detailed description of the preferred embodiment is read in conjunction with the drawings which illustrate such preferred embodiment.

DESCRIPTION OF THE PRIOR ART

Figure 1:
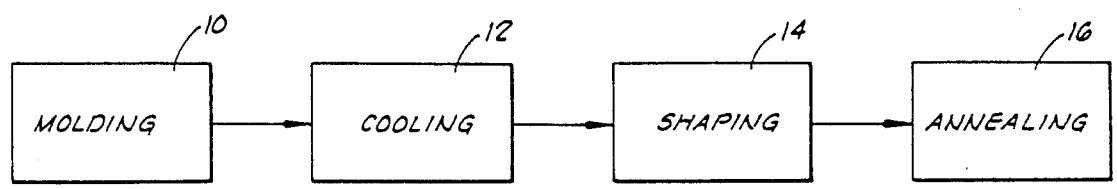
FIG. 1 illustrates a schematic of the process of making the single ply reinforced thermoplastic composite of the present invention.

Referring now to the drawings, and more particularly to FIG. 1, a schematic of the process for making the single ply reinforced thermoplastic composite of the present invention is shown. Generally, the method includes a molding or impregnating operation 10, followed as necessary by a cooling operation 12. After cooling, the composite is formed into a desired, predetermined shape during a shaping or forming operation. While retained in the predetermined shape, an annealing operation 16 is carried out.

Figure 2:
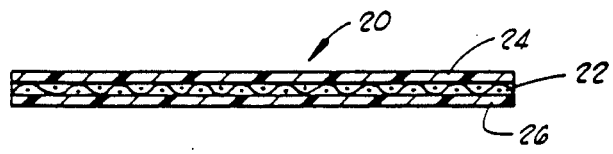
FIG. 2 is a cross-sectional view of the materials used to mold the composite sheet prior to the molding operation.

Referring now to FIG. 2, the unmolded form is generally shown and designated by the numeral 20. A layer of reinforcing material 22 has a layer of thermoplastic material 24 positioned adjacent thereto, and preferably another layer of thermoplastic material 26 positioned on the opposite side thereof.

Reinforcing material 22 is preferably fibrous and flexible such as a glass fabric. For example, Hexcel 7628 straight woven glass fiber may be used, but the invention is not intended to be limited to this particular material.

The thermoplastic material is of a kind which will retain its cell strength and not become brittle during annealing process 16, as described in more detail herein. Preferred thermoplastics for the present invention include polyarylene sulfide materials. One such material is polyphenylene sulfide (PPS) sold under the trademark Ryton ® by the assignee of the present invention. However, other thermoplastic materials may also be suitable, and it is not intended that the invention be limited only to PPS.

The layers of plastic material 24 and 26 are impregnated into the layer of reinforcing material 22 during molding process 10 to produce a single ply composite sheet. The sheet might also be referred to as a thin laminate. The molding process may be carried out in a conventional manner, such as in a heated press which simultaneously applies heat and pressure to form the composite sheet. In other words, a layup of thermoplastic film and reinforcing fabric is produced and then subjected to sufficient heat and pressure to form the composite. However, first forming a fabric prepreg carrying resin particles may also be used as a first step.

During the molding process, the resin softens and flows into and impregnates the fabric. Good wet-out of the fabric is required for desirable product properties. Depending on the amount of resin employed, the composite can have resin-rich surfaces or surfaces which show the imprint of the reinforcement. Distinct layers of resin and fabric are not essential in the product. The composite can be characterized accurately as a fibrous reinforcement in a continuous thermoplastic matrix.

After molding, cooling process 12 is carried out as necessary. This may be done in a conventional manner, such as in a water cooled press which cools the composite sheet while applying pressure thereon.

Figure 3:
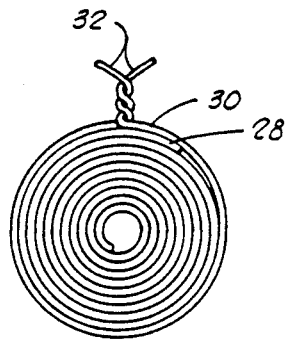
FIG. 3 illustrates the reinforced composite sheet held in a predetermined position for annealing.

In shaping or forming process 14, the cooled sheet may be trimmed to the desired size and then formed into the desired, predetermined shape. Referring now to FIG. 3, a composite sheet 28 has been rolled into a roll or coil form. Other predetermined shapes are possible, and the invention is not intended to be limited to the specific roll form illustrated in FIG. 3.

In one preferred embodiment, composite sheet 28 has a thickness in the range of about 0.003 inches to about 0.030 inches, and the composite sheet comprises in the range of about 10% by weight to about 30% by weight of fibrous reinforcement in a continuous crystalline thermoplastic matrix. After annealing operation 16, described in more detail herein, the thermoplastic matrix has a crystallinity such that a sheet will have the predetermined shape when at rest.

Once composite sheet 28 is in the desired predetermined form, it must be retained in this form during annealing process 16. Therefore, as part of shaping process 14, retaining means are applied for retaining the sheet in the predetermined shape. For the rolled or coiled embodiment shown in FIG. 3, at least one wire tie 30 is positioned around the roll form with its free ends 32 twisted around one another, thus providing one embodiment of the retaining means. Several wire ties 30 may be positioned longitudinally along rolled composite sheet 28 as necessary. Other retaining means could also be used.

With the retaining means in place, formed composite sheet 28 may then be annealed, such as by placing the sheet in an annealing oven. In the annealing process, the thermoplastic material is heated above its glass transition temperature, but below the softening temperature, to provide an environment where the material will acquire a more crystalline morphology. The glass transition temperature is that temperature below which the material is non-crystalline and brittle. For non-polyphenylene sulfide materials, it may be more accurate to state that the heat-up is above the cold crystalline temperature, which, in the case of polyphenylene sulfide, is close to the glass transition temperature. Stated in a broad sense, a suitable thermoplastic material for the composite of the present invention would include those thermoplastic materials which have a glass transition temperature which is above room temperature and are susceptible to being annealed.

After annealing at the appropriate temperature and for the appropriate time, the composite sheet is cooled in the oven or after removal therefrom. The retaining means, such as wire tie 30, is removed. The improved crystallinity caused by annealing does not completely disappear when the material is again cooled below the glass transition temperature. For the composite used in the present invention, the annealing process imparts a "memory" to the material of the configuration in which it was positioned during the annealing. That is, the sheet will retain its predetermined form, such as rolled composite sheet 28, once the retaining means is removed. Composite sheet 28 has sufficient flexibility that it may be extended or changed from its predetermined shape, and upon release, the sheet will return to its predetermined shape. For the rolled composite sheet 28, the sheet may be unrolled, and when released, will return to its original, rolled or coiled position, thus making it well suited for the window shade application described herein. The annealing process also makes the composite tougher and better suited for the window shade application.

Figure 4:
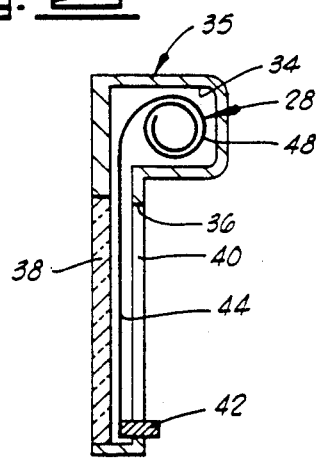
FIG. 4 is a vertical cross section of an aircraft window shade using the reinforced composite of the present invention and taken along lines 4—4 in FIG. 5.
Figure 5:
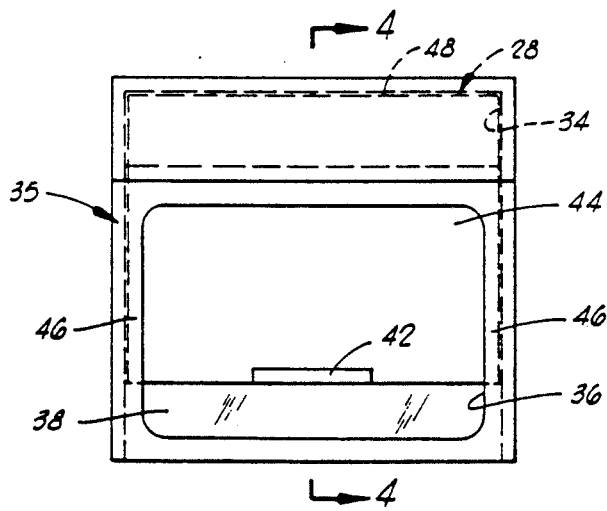
FIG. 5 is an elevation view of an aircraft window shade using the reinforced composite of the present invention.

One embodiment of an aircraft window shade utilizing composite sheet 28 is illustrated in FIGS. 4 and 5.

Rolled composite sheet 28 is positioned in a cavity 34 of a window shade housing 36. Below cavity 34 is an opening 36 which is generally conventional and similar to previously known window shade housings. Positioned behind opening 36 and spaced therefrom is window 38, also of a kind known in the art. A gap 40 is thus defined between opening 36 and window 38. A conventional plastic lens (not shown) may be positioned between opening 36 and window 38.

Rolled composite sheet 28 may be moved downwardly through gap 40 by pulling on a handle 42, a procedure which is well known. Thus, a substantially flat, unrolled portion 44 of sheet 28 acts as a window shade, covering window 38.

The sides of housing 35 adjacent opening 36 therein form a pair of guide means 46 for guiding flat portion 44 as it is moved downwardly and keeping it in a substantially flat configuration. There is preferably sufficient friction in guide means 46 such that an upper rolled portion 48 of sheet 28 will not cause flat portion 44 to be drawn upwardly. However, when the user pushes up on handle 42, flat portion 44 of sheet 28 will return to its rolled position.

The single ply composite sheet 28 thus provides an ideal window shade for an aircraft window, and is relatively less expensive than previously known multiple ply laminated window shades. For the aircraft industry, polyarylene sulfide materials would be highly desirable because of the low flammability of the resin. Polyphenylene sulfide is a preferred material due to its low cost as well as its low flammability.

The following indicate actual tests that were carried out in manufacturing a heat set reinforced composite sheet of the present invention:

EXAMPLE 1

A two mil layer of PPS was used on both sides of a layer of Hexcel 7626 straight woven glass fiber and molded in a Pasadena press between two grit-blasted plates with tetrafluoroethylene (TFE) non-porous release cloth on both sides. The piece was given 1.5 minutes contact time and two minutes at 100 psi.

The composite sheet was quickly moved to a water cooled Dake press and cooled at 100 psi. The sheet was then clean trimmed and rolled into a roll approximately 1.25 inches in diameter. Wire ties were used to keep the roll intact during an annealing process which was carried out in a Blue M oven at 400° F. for 1.5 hours.

Upon removal and cooling, the wire ties were removed and the sheet displayed a flexible roll that rolled up to its annealed shape when not bound flat.

EXAMPLE 2

A similar procedure was carried out using natural PPS film to which titanium oxide (TiO$_2$) had been added. This film was three mils thick. The ending roll was a solid opaque color and was very flexible with no brittleness present.

It can be seen, therefore, that the single ply reinforced thermoplastic composite and method of manufacture thereof of the present invention are well adapted to carry out the ends and advantages mentioned as well as those inherent therein. While a preferred embodiment of the apparatus and method, along with some examples have been illustrated herein, numerous changes in the arrangement and construction of parts and in the steps of the method may be made by those skilled in the art. All such changes are encompassed within the scope and spirit of the appended claims.

What is claimed is:

1. A method comprising the steps of:
   providing a roll of composite sheet, said composite sheet comprising fibrous reinforcement in a continuous matrix of thermoplastic resin, said resin being of the type having a glass transition temperature and a softening temperature;
   annealing said roll at a temperature between said glass transition temperature and said softening temperature so that said resin will acquire a more crystalline morphology, thereby setting a shape of said sheet to a configuration of a roll; and
   cooling the roll below said glass transition temperature.

2. The method of claim 1 wherein said step of providing a roll of composite sheet comprises applying heat at a temperature above said softening temperature and pressure to said thermoplastic resin for softening and flowing said resin into said fibrous reinforcement.

3. The method of claim 2 further comprising cooling said composite sheet after applying said heat and pressure.

4. The method of claim 1 wherein said fibrous reinforcement comprises a layer of woven glass fiber material.

5. A method of making a shaped composite sheet comprising the steps of:
   impregnating polyphenylene sulfide on a layer of reinforcing material such that a composite sheet is formed;
   cooling said composite sheet;
   shaping said composite sheet into a desired form; and
   annealing said composite sheet at a temperature between the glass transition temperature and the softening temperature of said polyphenylene sulfide while retaining said composite sheet in said form.

6. The method of claim 5 wherein said step of impregnating comprises impregnating a layer of polyphenylene sulfide approximately two mils thick on a layer of woven glass fiber.

7. The method of claim 5 further comprising:
   adding titanium oxide to said polyphenylene sulfide; and
   wherein said step of impregnating comprises impregnating a layer of said polyphenylene sulfide and titanium oxide approximately three mils thick on a layer of woven glass fiber.

8. The method of claim 5 wherein said step of impregnating comprises applying pressure to said polyphenylene sulfide and reinforcing material at approximately 100 psi.

9. The method of claim 5 wherein said step of shaping comprises rolling said composite sheet into a rolled form.

10. The method of claim 9 further comprising positioning retaining means on said composite sheet for retaining said composite sheet in said rolled form during said step of annealing.

11. The method of claim 5 wherein said step of annealing comprises heating said composite sheet at approximately 400° F. for a predetermined time.

12. The method of claim 11 wherein said predetermined time is approximately 1.5 hours.

13. A method comprising the steps of:
   providing a roll of composite sheet, said composite sheet comprising fibrous reinforcement in a continuous matrix of polyarylene sulfide resin of the type having a glass transition temperature and a softening temperature;

annealing said roll at an annealing temperature between said glass transition temperature and said softening temperature for setting a shape of said composite sheet to a configuration of a roll; and cooling the roll to a temperature below said glass transition temperature.

14. The method of claim 13 wherein said matrix further comprises titanium oxide.

15. The method of claim 13 wherein said annealing temperature is approximately 400° F.

16. The method of claim 15 wherein said annealing temperature is held for approximately 1.5 hours.

17. The method of claim 13 wherein said polyarylene sulfide is polyphenylene sulfide.

* * * * *